United States Patent [11] 3,594,858

| [72] | Inventor | Knud Simonsen<br>c/o Knud Simonsen Industries Limited,<br>71 Kelfield Street, Rexdale, Ontario,<br>Canada |
|---|---|---|
| [21] | Appl. No. | 753,547 |
| [22] | Filed | Aug. 19, 1968 |
| [45] | Patented | July 27, 1971 |

[54] SUPPORTING APPARATUS FOR USE IN SMOKEHOUSES AND THE LIKE
10 Claims, 5 Drawing Figs.

| [52] | U.S. Cl. | 17/44.4 |
|---|---|---|
| [51] | Int. Cl. | A22c 15/00, A23b 1/04 |
| [50] | Field of Search | 17/44, 44.2, 44.3, 44.4 |

[56] References Cited
UNITED STATES PATENTS

| 1,471,127 | 10/1923 | Henke | 17/44.4 |
| 1,972,773 | 9/1934 | Harris | 17/44.4 X |

FOREIGN PATENTS

| 140,599 | 2/1935 | Austria | 17/44.2 |
| 391,805 | 3/1924 | Germany | 17/44.4 |

*Primary Examiner*—Lucie H. Laudenslager
*Attorney*—George A. Rolston

ABSTRACT: This specification discloses an apparatus for use in association with the processing of sausage products such as are linked together in predetermined lengths of casing material, the apparatus consisting of a supporting member for engaging and supporting such a continuous casing length of linked sausages, and having an upper supporting rail and two lower spaced apart spacer rails, the upper supporting rail carrying the main portion of the weight of the length of sausages over which the sausages are looped, and the lower spacer rail members holding the individual loops of sausages apart from one another, and further incorporates means for hanging such supporting apparatus from a typical monorail conveyor for continuous movement through a processing line.

INVENTOR
KNUD SIMONSEN

BY: George A. Rolston
PATENT AGENT

INVENTOR
KNUD SIMONSEN

BY: George A. Rolston
PATENT AGENT

SUPPORTING APPARATUS FOR USE IN SMOKEHOUSES AND THE LIKE

This invention relates to apparatus for cutting sausage products and the like during processing, and particularly during passage through a smokehouse, and passage through a subsequent chilling zone.

The production of smoked sausage products such as weiners and the like according to one particularly preferred form of processing, is described in U.S. Letters Pat. No. 3,113,870, and the smokehouse and chilling apparatus is described in U.S. Letters Pat. No. 2,973,277. As stated in these two patents, the sausages are produced in a machine known as a stuffer which forces ground meat into continuous lengths of sausage casing, and twists the casing approximately every 5 inches to form a separate sausage. Typically such casings are supplied in lengths of 84 feet, 90 feet, 100 feet and even longer in some cases. According to the process and apparatus described in the aforesaid patents, the linked strands of weiners are supported on sticks passing through the successive loops, the sticks being supported at either end on parallel spaced-apart conveyor means which operate at a slow speed to move the sausages through the smokehouse. After passage through the smokehouse they then pass through a chilling zone and afterwards to an unloading zone, and at such zones they are removed from the conveyor for further processing.

The process and apparatus described in the aforesaid patents, while being a considerable advance over prior art batch processes involved two serious disadvantages. In the first place, the use of parallel spaced-apart conveyors such as moving chains and the like made it impossible for the conveyor system to turn corners, and made it extremely difficult to arrange in an inclined manner. As a result, the conveyor system was usually arranged in a straight line, and at a height which caused workers substantial difficulties in loading and removing the already loaded sticks of weiners. For this reason, the shortest casing lengths, in the region of 84 feet, were generally regarded as the maximum length which could conveniently be loaded and unloaded by one person on this type of apparatus, and as a result, the more economical casing lengths could not be used on this type of continuous apparatus. In addition, the use of such a conveyor system in a straight line made it necessary to build a smokehouse and a chilling zone in one line thereby making highly uneconomical use of space. A further disadvantage arising from the use of sticks for supporting the successive loops of sausages was the fact that where the two sausages adjacent to each side of the stick in each loop contact the stick, an unsightly white blemish is left after processing which detracts from the appearance of the end product and leads to a certain degree of wastage. However, this marking of the sausages was generally regarded as unavoidable since the stick has to be made a certain width sufficient to maintain the coils of weiners separated from one another, since otherwise the successive loops would tend to wind around each other, causing blemishes to occur wherever they were in contact with one another.

One attempt to overcome some of these disadvantages is shown in U.S. Letters Pat. No. 3,204,844 granted to C. H. Wallis, Sept. 7, 1965. In this disclosure, use is made of a single rail conveyor from which T-shaped support bars are suspended, the linked sausages being festooned or hung from the support members in a continuous manner by means of a special loading machine adapted to feed six columns of linked sausages simultaneously side-by-side in parallel lines. This procedure overcame the problem of the sausages twisting when supported in the smokehouse, and also solved the problem relating to the conveyor rail system, since when using a single rail conveyor, the rail can be arranged to traverse corners and go up and down inclines without difficulty, thereby enabling the smokehouse to be arranged in two sections side-by-side with one another for example, and the chilling zone to be arranged in a third section alongside the smokehouse. However, this system involved very considerable additional capital outlay, and also involved the use of additional supervisory personnel both for feeding the sausages into the loading machine, and also for supervising the loading of the sausages onto the separate hangers, the speed of movement of the conveyor system having to be critically method to the speed of the loading machine at all times.

To meet the disadvantages of the process and apparatus described in U.S. Letters Pat. No. 2,973,277, and without incurring the extra capital expense required to build and operate the equipment described in U.S. Letters Pat. No. 3,204,844 applicants have now provided a composite sausage supporting stick and spacer member upon which the linked sausages may be arranged by hand as in U.S. Letters Pat. No. 2,973,277, the supporting portion of the member being shaped and adapted to contact the twisted skine portion forming the link between the pair of adjacent sausages at the upper end of each loop, thereby carrying the weight of the loop, and the spacer members being adapted to contact the twisted skin link portion at the lower end of each of such pair of sausages thereby maintaining the two portions of each loop separate and untwisted, both functions being achieved without leaving blemishes on the sausages themselves. In addition, according to the practice of the invention, the composite stick and spacer member is adapted to be supported by hanger means suspended from a monorail conveyor system, thereby enabling it to traverse corners and incline without difficulty.

It is a general objective of the invention to provide supporting apparatus for the suspended support of sausage products during the processing, incorporating support means and spacer means, permitting the sausage product to be arranged thereon by hand and suspended without contact with one another during processing, and incorporating hanger means adapting the same for suspension from a monorail conveyor system.

More particularly, it is an objective of the invention to provide a supporting apparatus having the foregoing advantages which is particularly adapted for use in association with a sausage making machine of the type used for producing skinless sausages in which the sausages are produced joined together in a continuous casing of predetermined length, the linked sausages being festooned on a rack forming part of the machine, from which they may be transferred by hand onto the support apparatus according to the invention.

More particularly, it is an objective of the present invention to provide a support apparatus having the foregoing advantages which incorporates a support means, spacer means for maintaining the length of linked sausage products apart from one another, and hanger means adapting the same to be hung from a monorail conveyor.

The foregoing and other advantages will become apparent from the following description of a preferred embodiment of the invention which is given here by way of example only with reference to the following drawings in which like reference devices refer to like parts thereof through the various views and diagrams and in which.

Figure 1:
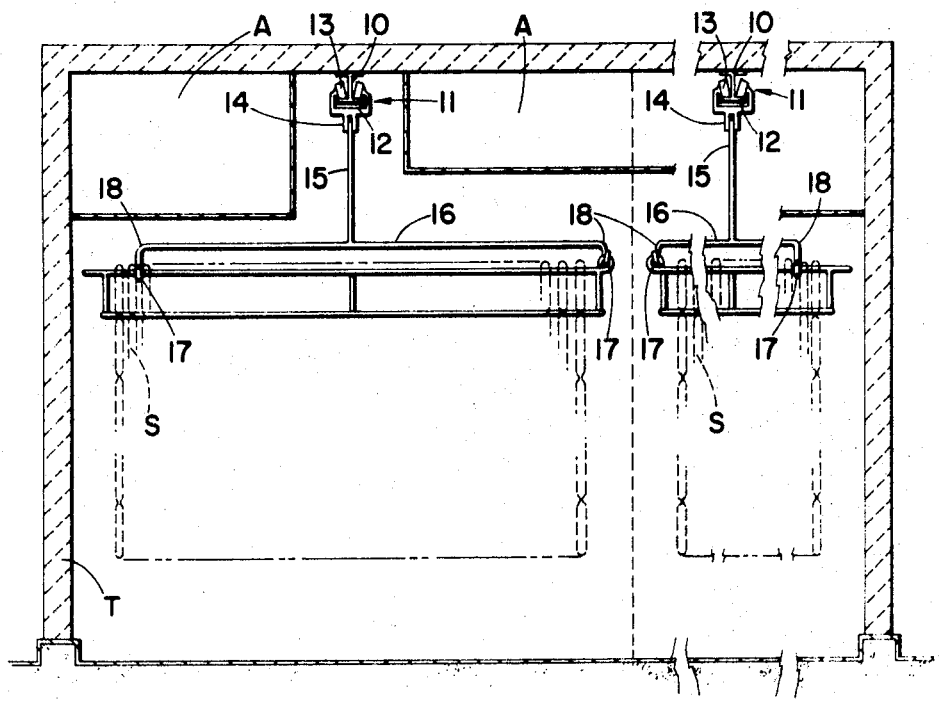
FIG. 1 is a schematic illustration of a processing zone (shown in section) such as a smokehouse, showing the support apparatus in side elevational view with sausage products shown in phantom supported thereon.

The manufacture and general processing details of sausage products such as skinless weiners and frankfurters is fully described in the issued patent already referred to. As stated, the sausages are manufactured in a machine known as a "stuffer" which continuously forces ground up meat into a continuous casing, and twists the casing approximately every 5 inches or so thereby forming a continuous string of sausages linked together. As the string of sausages is fed from the "stuffer" it is fed onto a moving support device incorporating a plurality of hooks, and is formed into a series of loops with the apex of each loop supported on a separate hook until the entire 84-foot length of casing, formed into linked sausages, is supported on the supporting device. The manufacture and operation of the stuffer and the supporting device accompany it, form no part of this invention, this piece of equipment being a commercial unit now available on the market, one model manufactured by Townsend Engineering Company of Des Moines, Iowa, being one particularly suitable form of this type of apparatus, although there are others available. In some cases two or more stuffers may be used to supply a single smokehouse for faster operation.

As stated, the sausage supporting apparatus according to the invention is employed in order to collect each completed casing length of linked sausages from the stuffer and transfer it by hand to the processing system, and supporting such sausages during processing. For the purposes of this description, the processing system is shown simply as a tunnel of rectangular-shaped cross section indicated as T. Suitable hot air and return air ducts indicated generally as A are arranged for maintenance of the stable processing temperature and humidity which may be varied and controlled by means (not shown) so as to perform any desired processing sequence as for example is described in the granted patents referred to. Within the tunnel T a continuous monorail 10 is provided running down one side and up the other with a U-shaped return at one end thereby permitting more efficient and economical use of space, and permitting a higher processing speed to be maintained. The monorail 10 will of course continue through a chiller, unloading zone, washer and any other desired operation, and back through the stuffer, these details being omitted for the sake of clarity.

Running on the monorail 10 are a series of trolley units indicated generally as 11 having a yoke 12 and rollers 13. A continuous rivetless chain 14 is connected to each yoke 12 and is driven by any suitable motor means (not shown).

Depending from each such trolley unit 11 is a generally inverted T-shaped hanger member having a central stem 15 and a rigid crossbar 16 welded thereto. At each end of crossbar 16 a hook member 17 is provided at the end of a downwardly angled arm portion 18 thereby spacing hook member 17 a substantial distance below crossbar 16 in order to permit ample clearance therebetween.

Figure 2:
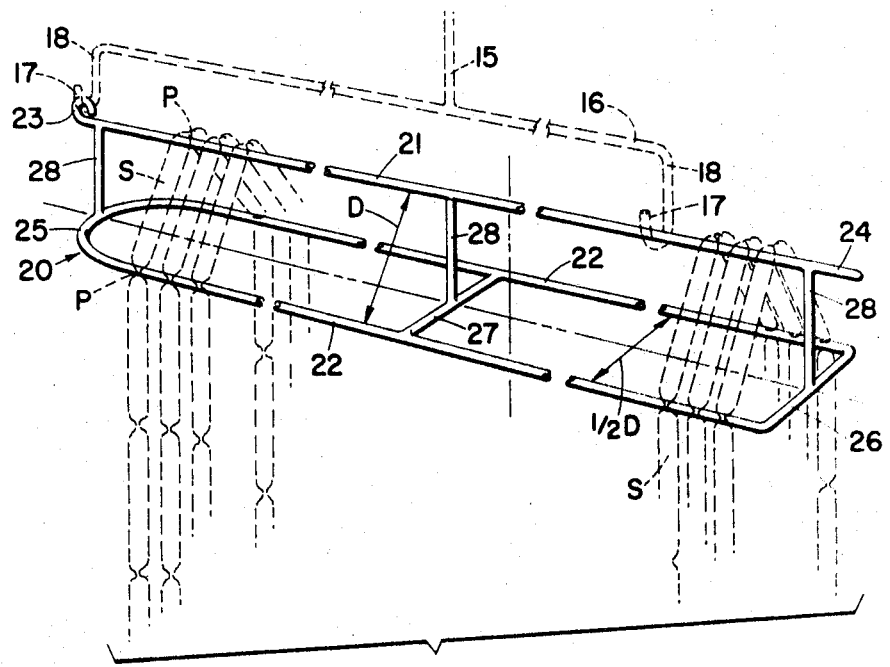
FIG. 2 is a cutaway perspective illustration of the support apparatus shown in FIG. 1, with a hanger member shown in phantom connected thereto and with sausage products in phantom supported thereon.
Figure 3:
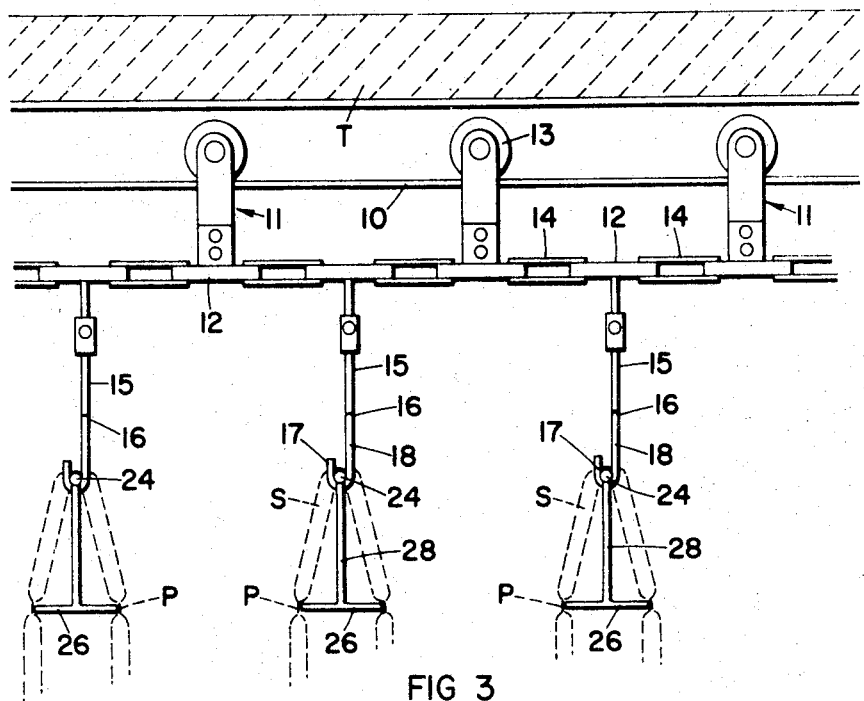
FIG. 3 is a greatly enlarged end elevational view of the support apparatus shown in FIGS. 1 and 2, with the roof of the processing zone shown in section, and showing the monorail conveyor system in side elevation.

The sausage support apparatus according to the invention referred to generally as 20 is shown in greater detail in FIG. 2, and will be seen to comprise an upper supporting rail 21 of a length greater than the spacing between the two hook portion 17, and two lower spacer rails 22, having a length slightly less than the length of the upper rail 21. Upper rail 21 is provided at one end with an eye 23 arranged and oriented in a substantially vertical plane, and aligned with the axis of rail 21 for reception of one of hooks 17 therein, and is provided at the other end with an endwise extension 24 the purpose of which is to assist in unloading, in a manner to be described later herein. The two lower spacer rails 22 are joined together at one end to form a rounded U-shaped configuration indicated as 25, at the end adjacent to the eye 23 of upper support rail 21, and at their other ends they are joined by a transverse junction member 26. An additional intermediate junction member 27 is provided intermediate the two ends. Three supporting stem members 28 are connected between upper support rail 21 and lower spacer rail 22, being connected thereto at the U-shaped member 25 and at a transverse members 26 and 27 respectively whereby to locate the lower spacer rails 22 a predetermined distance below the upper support rail 21. As shown in FIG. 2, the spacing between the upper support rail and each of lower spacer rail 22 is equal to the length of a sausage D whereby to ensure that when the continuous linked sausages are arranged in a festoon in FIG. 2, that the upper support rail 21 engages the twisted casing portion P between two sausages and each of the lower spacer rail 22 also engage the twisted casing portion P between two sausages, such distance preferably being therefore equal to the length D of one sausage as shown. In addition, in order to ensure that the coils of sausages do not become twisted on one another and contact one another during processing, the spacer rails 22 are spaced apart from one another a distance which is equal to between about one-quarter and one-half of D.

Figure 4:
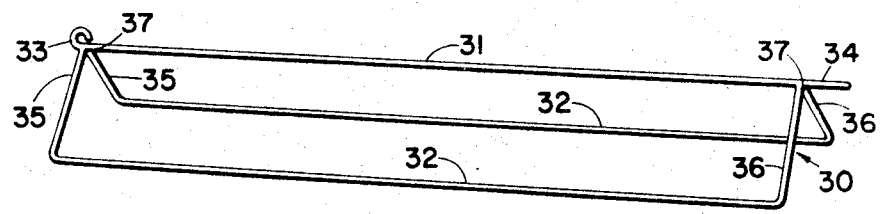
FIG. 4 is a perspective illustration of a further embodiment of the invention; and, FIG. 5 is a schematic perspective illustration showing a further embodiment of the invention providing for the automatic unloading of sausage products from the support apparatus of the invention at an unloading station.

An alternate construction of sausage support apparatus 30 is shown in FIG. 4, and comprises an upper supporting rail 31 of a length greater than the spacing between the two hook portions 17, and two lower spacing rails 32, having a length slightly less than the length of the upper rail 31. Upper rail 31 is provided at one end with an eye 23 arranged and oriented in a substantially vertical plane, and aligned with the axis of rail 31 for reception of one of the hooks 17 therein, and is provided at the other end with an endwise extension 34 the purpose of which is to assist in unloading in a manner to be described later herein. The two lower spacer rails 32 are joined to the upper rail 31 on two supporting stem members 35 and 36. The supporting stem members 35 and 36 are merely endwise extensions of the ends of the lower spacer rails 32 and are welded to the upper rail 31 at weld spots 37. The lower spacer rails 32 are located again a predetermined distance D from the upper support rail 31, and are spaced apart a distance between about one-quarter and one-half D.

Figure 5:
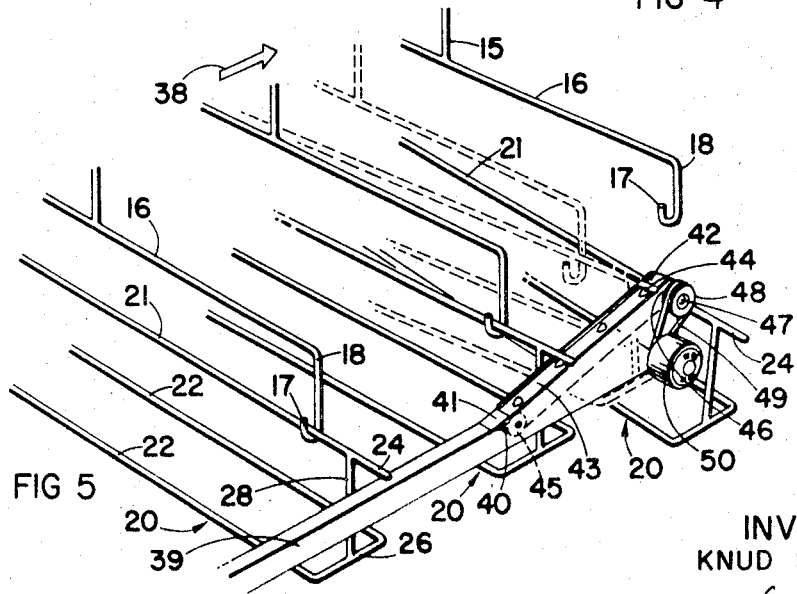

An unloading station is shown in FIG. 5, where the monorail 10 moves in the direction shown by arrow 38. On the side opposite the eye 23, parallel to the path of travel shown by arrow 38 is a bar 39 having a rectangular cross section which extends from any suitable support (not shown) in the direction of the arrow 38. At the free end of the bar 39 is an extended wedge-shaped arm 40 having a top surface 41 which diverges upwardly from the top surface of the bar 39. Positioned adjacent to the upper surface 41 is an endless conveyor belt 42 moving in the direction of the arrow 38. The belt 42 has an outer surface 43 with a number of projections 44 thereon. Belt 42 passes around a lower rotatable pulley 45 adjacent the extension arm 40 and a driven pulley 46 which is connected on an axle 47 to which is also secured a sprocket 48. An endless chain drive means 49 is connected between sprocket 48 and a sprocket (not shown) on an electric motor 50. The chain drive means 49 drives the sprocket 48 and the conveyor belt 42 in the direction shown by the arrow 38.

In operation, as the "stuffer" (not shown) forms the casings into individual uncured sausage sections S which remain connected in continuous end-to-end relationship by the twisted casing portion P the string of sausages is fed onto the moving hook support device (not shown) as previously described. The lengths of sausage sections S are then hanging in loops of convenient length and the support apparatus 20 is passed by hand into one end of the series of loops of sausages until the eye 23 extends from the other end, the U-shaped, end 25 facilitating the introduction thereof between such loops. The support apparatus 20 is then raised by hand in an upward direction so that the upper support rail 21 engages each of the loops of sausage sections at the upper twisted portions P thereby lifting them clear of the hooks of the hook support device (not shown). The loops of sausages are then supported on the sausage support apparatus 20, and the twisted portions P at the lower ends of the two upper sausages is engaged by respective spacer rails 22.

At the loading station, the monorail 10 is arranged at a reduced height so that the crossbar 16 passes the person loading the festooned sausages on the support apparatus 20 onto the crossbar 16 at approximately shoulder height. This is preferred as the person at the loading station will not have to raise the string of sausages and the support apparatus 20 to any considerable height whatsoever. The support apparatus 20 is connected to the crossbar 16 by placing the eye 23 on one hook member 17 of the arm portion 18 and the other hook member 17 is engaged near the other end of the support rail 21. The speed at which the trolley units 11 move is regulated to the speed at which the festooned string of sausages come out of the stuffing machine (not shown) and can be placed on the support apparatus 20 and hung on the crossbar 16 which can be as high as one complete 84-foot casing every 20 sections. When moving along the monorail 10 the support apparatus 20 carries the sausage sections S in substantial vertical dependent position with the upper twisted casing portion P on the upper support rail 21 and the two lower support rails 22 contacting and separating the lower portion P. The sausage sections S are not in contact with the support rail 21 or spacer rails 22 so that no marks are left on the sausage sections S.

The monorail 10 carries the support apparatus 20 through the different stages of the process where the sausages are fully cooked, smoked and cooled, and the sausages are then taken off at the upper twisted portions P thereby them clear of the hooks of the hook support device (not shown). The loops of sausages are then supported on the sausage support apparatus 20, and the twisted portions P at the lower ends of the two upper sausages is engaged by respective spacer rails 22.

At the loading station, the monorail 10 is arranged at a reduced height so that the crossbar 16 passes the person loading the festooned sausages on the support apparatus 20 onto the crossbar 16 at approximately shoulder height. This is preferred as the person at the loading station will not have to raise the string of sausages and the support apparatus 20 to any considerable height whatsoever. The support apparatus 20 is connected to the crossbar 16 by placing the eye 23 on one hook member 17 of the arm portion 18 and the other hook member 17 is engaged near the other end of the support rail 21. The speed at which the trolley units 11 move is regulated to the speed at which the festooned string of sausages come out of the stuffing machine (not shown) and can be placed on the support apparatus 20 and hung on the crossbar 16 which can be as high as one complete 84 foot casing every 20 sections. When moving along the monorail 10 the support apparatus 20 carries the sausage sections S in substantial vertical dependent position with the upper twisted casing portion P on the upper support rail 21 and the two lower support rails 22 contacting and separating the lower portion P. The sausage sections S are not in contact with the support rail 21 or spacer rails 22 so that no marks are left on the sausage sections S.

The monorail 10 carries the support apparatus 20 through the different stages of the process where the sausages are fully cooked, smoked and cooled, and the sausages are then taken off the support apparatus 20 at an unloading station. The structure of the support apparatus 20 permits an automatic unloading of the sausages from the support apparatus 20 at the unloading section as shown in FIG. 5. The support apparatus 20 is moving in the direction shown by the arrow 38 and the endwise extension 24 of the upper support rail 21 engages the upper surface 41 of the extension arm 40. The yoke 12 is pivoted rearwardly slightly but the weight of the festooned sausages and the support apparatus 20 prevents the crossbar 16 from being pivoted too far rearwardly. The endwise extension 24 of the upper support rail 21 rides on the upper surface 41 and comes in contact with the outer surface 43 of the moving conveyor belt 42. The endwise extension 24 is raised upwards and is lifted free of the hook member 17 of the arm portion 18 of the crossbar 16 by engagement of a protrusion 44 of belt 42. The crossbar 16 does not tip as it is securely held from sideways movement by the yoke 12. The endwise extension 24 makes contact with one of the projections 44 on the conveyor belt 42 and is moved to the end of the belt 42 where the endwise extension 24 drops free of the hook member 17 of the crossbar 16. The support apparatus 20 is connected to the crossbar 16 at the other end by the eye 23 on the hook member 17. When the extension 24 moves passed the arm portion 18 of the crossbar 16 the string of sausages fall off the support apparatus 20 onto a loading table (not shown) the eye 23 remaining on the hook member 17 so that the support apparatus 20 is carried thereby for any desired treatment such as sterilization.

It should be noted that the structure of the support apparatus 20 can be altered, as shown in FIGS. 2 and 4, and still stay within the scope of the invention. The eye 23 or 33 may be easily removed and be replaced merely by an endwise extension 24 which will permit the support apparatus 20 to be used in the previously known prior art methods of processing sausages. The support apparatus 20, as shown in FIG. 4, is easily stackable and will require little room for storage until used. The support apparatus 20 may be made from stainless steel, aluminum, or good quality steel which will withstand the temperatures and humidity of the process it is involved in. This support apparatus 20 speeds up the loading process so that it is possible to use two or more stuffers at the loading station to feed one smokehouse.

It will be understood that in this particularly preferred embodiment, the support apparatus 20 is most advantageously constructed with the dimension D corresponding precisely to the length of a sausage S, thereby ensuring that the support apparatus performs in the most effective manner. However, in some cases, meat processors will wish to produce sausages of a variety of different lengths to suit different markets. Generally speaking, if the variety of different sausage lengths will be produced in sufficient volume, it will be found to be preferable to provide a supply of support apparatus 20 to suit the dimensions of each variety of sausage. However, in many cases, the investment required will be beyond the means of the meat processor, and accordingly, the support apparatus 20 will be made with the dimension D corresponding to the length of sausage which is produced in the greatest volume. When it is desired to produce sausages of a different length, then the support apparatus 20 will be used in the same way as described above, that is to say with the twisted portion P at the top of each loop lying over the other supporting rail 21 (or 31) as the case may be, but with the two lower spacer rails 22 contacting the sausage S itself rather than contacting the twisted casing portion P. When operating in this way, it has been found by experience that, due to the smooth rounded configuration of the support rails 22 (or 32) the point at which such support rails contact the sausages S during processing, is only very slightly marked, so as to be almost indistinguishable.

It will also be understood that while reference has been made to twisted casing portions, the invention is also applicable to sausage lengths which are formed with casings which are tied with cord or twine between each sausage.

It will be understood that although a specific embodiment co the invention has been described herein and illustrated, the invention also contemplates such variations that may fall within the scope of the dependent claims.

What I claim is:

1. Apparatus for supporting sausage products on a processing line, said sausage products being linked together in predetermined lengths by portions of casing material between each such sausage, said apparatus comprising:
   upper support rails means of a predetermined width small enough to fit between the two adjacent ends of a pair of sausages in a said length, and engage the casing portion therebetween and support the weight thereof;
   lower spacer rail means arranged parallel to said upper support rail means and equidistant therefrom a predetermined distance, and spaced apart from one another a distance sufficient to maintain loops of sausages arranged therearound apart from one another and located an equal distance apart from one another on either side of a vertical plane intersecting said upper support rail means;
   supporting stem members extending from said upper support rail means for connecting said lower spacer rail means thereto,
   a hanger bar; and dependent hanger means at each end of said hanger bar for engaging said upper support rail means, said hanger means being spaced apart along said hanger bar a distance less than the length of said upper support rail means.

2. Apparatus as claimed in claim 1 wherein said lower spacer rail means meet and merge with one another, at one end thereof and form a curved end portion at such end, and intermediate junction members extending between said lower spacer rail means at spaced intervals therealong, said supporting stem members being arranged and located in a substantially vertical plane and extending between said upper support rail means and said curved end and said junction members respectively.

3. Apparatus as claimed in claim 1 wherein said stem supporting members comprise endwise extensions of said lower spacer rail means bent upwardly and inwardly, and connected at their free ends to said supper support rail means, thereby defining a free space between said lower spacer rail means for stacking said apparatus one above the other.

4. Apparatus as claimed in claim 1 including eye means at one end of said upper support rail means, and one of said hanger means being shaped and adapted to fit within and engage said eye means.

5. Apparatus as claimed in claim 1 wherein said lower spacer rail means are spaced from said upper support rail means a predetermined distance being equal to the length of a said sausage, and wherein said lower spacer rail means are spaced apart from one another a distance equal to between about one-quarter and one-half said predetermined distance.

6. Apparatus as claimed in claim 1 including continuous carriage means, and sausage supporting apparatus as aforesaid located therealong at spaced intervals, each said hanger bar of each said supporting apparatus being permanently attached thereto at spaced intervals and being movable with said carriage means along a predetermined path, and support rail elevating means mounted adjacent said carriage means in predetermined location along said path and oriented to engage the other said end of said upper support rail means and displace same upwardly for partial disengagement from said hanger means.

7. Apparatus as claimed in claim 1 including hanger stem means extending upwardly from said hanger bar means between its said ends for supporting said upper and lower support rail means in a substantially horizontal plane.

8. Apparatus as claimed in claim 1 including endwise extension members formed on each end of said upper support rail means, extending outwardly beyond the length of said lower spacer rail means.

9. Apparatus as claimed in claim 1 wherein said hanger means comprise downwardly dependent hook members adapted to fit around and support said upper support rail means.

10. Apparatus as claimed in claim 1 wherein said hanger means are arranged with one said hanger means engaging said upper support rail means at one end thereof, said other hanger means engaging said upper support rail intermediate the ends thereof, and including hanger stem means located on said hanger bar spaced more or less equidistant between said ends of said upper support rail means whereby to support same in a substantially horizontal plane.

UNITED STATES PATENT OFFICE
CERTIFICATE OF CORRECTION

Patent No. 3,594,858           Dated July 27, 1971

Inventor(s) Knud Simonsen

It is certified that error appears in the above-identified patent and that said Letters Patent are hereby corrected as shown below:

Column 2, line 16, after "twisted", change "skine" to read -- skin -- ; line 71, "the invention," should read -- support apparatus, -- . Column 4, line 7, "rail" should read -- rails -- . Column 5, line 42, "sections" should read -- seconds -- . Column 6, line 55, "dependent" should read -- appended -- .

Signed and sealed this 26th day of December 1972.

(SEAL)
Attest:

EDWARD M. FLETCHER, JR.
Attesting Officer

ROBERT GOTTSCHALK
Commissioner of Patents